(12) United States Patent
Bouillet et al.

(10) Patent No.: US 9,183,741 B2
(45) Date of Patent: *Nov. 10, 2015

(54) ESTIMATION OF ARRIVAL TIMES AT TRANSIT STOPS

(71) Applicant: International Business Machines Corporation, Armonk, NY (US)

(72) Inventors: Eric P. Bouillet, Englewood, NJ (US); Francesco Calabrese, Dublin (IE); Fabio Pinelli, Dublin (IE); Mathieu Sinn, Dublin (IE); Ji W. Yoon, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/664,065

(22) Filed: Oct. 30, 2012

(65) Prior Publication Data

US 2014/0095066 A1    Apr. 3, 2014

Related U.S. Application Data

(63) Continuation of application No. 13/629,940, filed on Sep. 28, 2012.

(51) Int. Cl.
*G08G 1/123* (2006.01)
*G06Q 10/02* (2012.01)
*G08G 1/01* (2006.01)

(52) U.S. Cl.
CPC ............ *G08G 1/0104* (2013.01); *G06Q 10/025* (2013.01); *G08G 1/123* (2013.01); *G08G 1/0129* (2013.01); *G08G 1/0141* (2013.01)

(58) Field of Classification Search
USPC .................................. 701/118, 119, 120, 465
See application file for complete search history.

(56) References Cited

U.S. PATENT DOCUMENTS 5,400,020 A * 3/1995 Jones et al. ................... 340/994
5,948,040 A    9/1999 DeLorme et al.
(Continued)

FOREIGN PATENT DOCUMENTS

CN    101123515 B    6/2010
CN    101388143 B    4/2011
(Continued)

OTHER PUBLICATIONS

Ackerman, et al., "Single-Bit Correct, Double-Bit Detect Error Checking/Correction Scheme"; http://www.ip/com/pubview/IPCOM000112383D; Mar. 27, 2005.
(Continued)

*Primary Examiner* — Tuan C. To
*Assistant Examiner* — Dale W Hilgendorf
(74) *Attorney, Agent, or Firm* — Cantor Colburn LLP (57) ABSTRACT

Embodiments of the disclosure include a method for providing a consolidated estimated time of arrival in a scheduled transportation system. The method includes receiving at least one of a scheduled time of arrival, a real-time estimated time of arrival and a predictive estimated time of arrival and assigning a weight to each of the scheduled time of arrival, the real-time estimated time of arrival and the predictive estimated time of arrival. The method also includes calculating a confidence level and the consolidated estimated time of arrival based on the weights and the scheduled time of arrival, the real-time estimated time of arrival and the predictive estimated time of arrival.

8 Claims, 4 Drawing Sheets

(56) References Cited

U.S. PATENT DOCUMENTS

| | | | |
|---|---|---|---|
| 6,006,159 A * | 12/1999 | Schmier et al. | 701/465 |
| 6,580,998 B2 * | 6/2003 | Flynn et al. | 701/120 |
| 6,734,823 B2 | 5/2004 | Mintz et al. | |
| 7,324,893 B2 * | 1/2008 | Yamashita et al. | 701/117 |
| 7,603,281 B1 * | 10/2009 | Miller et al. | 705/1.1 |
| 7,914,100 B2 | 3/2011 | Kashimoto et al. | |
| 8,050,949 B2 | 11/2011 | Purang et al. | |
| 8,284,076 B1 | 10/2012 | Horstemeyer | |
| 2002/0002548 A1 * | 1/2002 | Roundtree | 707/1 |
| 2003/0055666 A1 | 3/2003 | Roddy et al. | |
| 2003/0135304 A1 | 7/2003 | Sroub et al. | |
| 2003/0171939 A1 | 9/2003 | Yagesh et al. | |
| 2004/0199415 A1 | 10/2004 | Ho | |
| 2004/0243430 A1 | 12/2004 | Horstemeyer | |
| 2005/0164673 A1 | 7/2005 | Ehlers | |
| 2006/0046732 A1 | 3/2006 | Grossman et al. | |
| 2006/0155465 A1 | 7/2006 | Jung et al. | |
| 2006/0178949 A1 | 8/2006 | McGrath | |
| 2006/0212187 A1 | 9/2006 | Wills et al. | |
| 2006/0224426 A1 | 10/2006 | Goossens et al. | |
| 2007/0052586 A1 | 3/2007 | Horstemeyer | |
| 2008/0014908 A1 | 1/2008 | Vasant | |
| 2008/0071466 A1 | 3/2008 | Downs et al. | |
| 2008/0158016 A1 | 7/2008 | Wang et al. | |
| 2008/0275643 A1 | 11/2008 | Yaqub et al. | |
| 2009/0005963 A1 | 1/2009 | Jarvinen | |
| 2009/0157298 A1 | 6/2009 | Kon et al. | |
| 2010/0121563 A1 | 5/2010 | Chavez et al. | |
| 2010/0145609 A1 | 6/2010 | Boss et al. | |
| 2010/0205021 A1 | 8/2010 | Jewett et al. | |
| 2010/0268447 A1 * | 10/2010 | Griffiths | 701/200 |
| 2010/0280750 A1 * | 11/2010 | Chen et al. | 701/204 |
| 2010/0332131 A1 * | 12/2010 | Horvitz et al. | 701/210 |
| 2011/0082636 A1 | 4/2011 | Barker et al. | |
| 2011/0112759 A1 | 5/2011 | Bast et al. | |
| 2011/0246246 A1 | 10/2011 | Johnson | |
| 2011/0301840 A1 | 12/2011 | Wang | |
| 2012/0010803 A1 | 1/2012 | Min et al. | |
| 2012/0041675 A1 | 2/2012 | Juliver et al. | |
| 2012/0053830 A1 | 3/2012 | Bach | |
| 2012/0066251 A1 | 3/2012 | Gontmakher et al. | |
| 2012/0136561 A1 | 5/2012 | Barker et al. | |
| 2012/0226434 A1 | 9/2012 | Chiu | |
| 2012/0253867 A1 | 10/2012 | Davidson | |
| 2012/0290182 A1 * | 11/2012 | Cooper et al. | 701/118 |
| 2013/0060468 A1 | 3/2013 | Delling et al. | |
| 2013/0073195 A1 | 3/2013 | Nesbitt et al. | |
| 2013/0096827 A1 | 4/2013 | Mccall et al. | |
| 2013/0144517 A1 | 6/2013 | Kickbusch | |
| 2013/0151111 A1 | 6/2013 | Skelton | |
| 2013/0204525 A1 | 8/2013 | Pfeifle | |
| 2013/0214940 A1 | 8/2013 | Sako et al. | |
| 2013/0261956 A1 | 10/2013 | Marks | |
| 2013/0265154 A1 | 10/2013 | Tumayan et al. | |
| 2013/0304347 A1 | 11/2013 | Davidson | |
| 2013/0325315 A1 | 12/2013 | Beaurepaire | |
| 2014/0012498 A1 | 1/2014 | Gustafson et al. | |
| 2014/0012634 A1 | 1/2014 | Pearlman et al. | |
| 2014/0058674 A1 | 2/2014 | Shekhar et al. | |

FOREIGN PATENT DOCUMENTS

| | | |
|---|---|---|
| JP | 2001222796 A | 8/2001 |
| WO | 2008060308 A2 | 5/2008 |
| WO | 2011016901 A1 | 2/2011 |
| WO | WO2011016902 A1 | 2/2011 |

OTHER PUBLICATIONS

Damodaram, et al; "Error Detection and Correction Options for Data Services in B-ISDN"; GLOBECOM '90: IEEE Global Telecommunications Conference and Exhibition; pp. 1751-1757; Commuications: Connection to the Future:; vol. 3; IEEE; 1990.

Kerrigan, et al.; "Error Correction Procedure to Correct One Hard and One Soft Error Using a Single Error Correcting Code"; htpp://www.ip.com/pubview/IPCOM000047387D; Feb. 7, 2005.

Litwin, et al; "Error Control Coding"; IEEE Potentials, vol. 20, No. 1, pp. 26-28, Feb.-Mar. 2001.

\* cited by examiner

ESTIMATION OF ARRIVAL TIMES AT TRANSIT STOPS

CROSS-REFERENCE TO RELATED APPLICATION

This application is a continuation of U.S. patent application Ser. No. 13/629,940, filed Sep. 28, 2012, the disclosure of which is incorporated by reference herein in its entirety.

BACKGROUND

The present invention relates to estimating arrival times at transit stops, and more specifically, to estimating arrival times at transit stops for a scheduled transportation system.

Scheduled transportation systems are transportation systems in which a vehicle follows one or more predefined routes and makes scheduled stops along the routes. Each route may be served by one or more vehicles during a day, with each vehicle being scheduled to stop at one or more locations along the route. A journey is single run of a vehicle along a journey pattern, or a collection of routes, with planned stop locations and times. The collections of all vehicle journey patterns combine to form a production table.

Due to variations in traffic conditions, unplanned delays, and the like it may be impossible for vehicles to arrive at the stop locations at the scheduled times in the production table. Many current scheduled transportation systems attempt to provide updates to the users of the scheduled transportation system about changes to the scheduled stop times in the production time table. This information often includes an estimated time of arrival of a vehicle at a location. The estimated time of arrival may be an absolute time, e.g., 10:00 pm, or a relative time, e.g., in 5 min, which can be compared to the scheduled time of arrival.

Several different methods are currently used to calculate the estimated time of arrival of the vehicle at a location. However, the methods currently used are either inaccurate or depend on information that may not always available.

SUMMARY

Embodiments include a method for providing a consolidated estimated time of arrival in a scheduled transportation system. The method includes receiving a scheduled time of arrival and calculating the consolidated estimated time of arrival based on the scheduled time of arrival and associating a confidence level with the consolidated estimated time of arrival. Based on receiving a real-time estimated time of arrival, the method includes re-calculating the consolidated estimated time of arrival based on the scheduled time of arrival and the real-time estimated time of arrival and increasing the confidence level with the consolidated estimated time of arrival. Based on receiving a predictive estimated time of arrival, the method includes re-calculating the consolidated estimated time of arrival based on the scheduled time of arrival, the real-time estimated time of arrival, and the predictive estimated time of arrival and increasing the confidence level with the consolidated estimated time of arrival.

Embodiments also include a method for providing a consolidated estimated time of arrival in a scheduled transportation system. The method receiving at least one of a scheduled time of arrival, a real-time estimated time of arrival and a predictive estimated time of arrival and assigning a weight to each of the scheduled time of arrival, the real-time estimated time of arrival and the predictive estimated time of arrival. The method also includes calculating a confidence level and the consolidated estimated time of arrival based on the weights and the scheduled time of arrival, the real-time estimated time of arrival and the predictive estimated time of arrival.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

One method of estimating a time of arrival of a vehicle at a stop, referred to herein as a static method, is to use scheduled stop information and assume that the vehicles will unconditionally arrive at the scheduled times. One disadvantage of the static method is that there may be many reasons why a vehicle cannot meet a scheduled arrival time, such as traffic incidents, traffic congestion, vehicle break down, and thus it cannot be expected that the vehicle will always be able to meet its schedule. As a result the scheduled time of arrivals are generally considered to be inaccurate.

Another method of estimating a time of arrival of a vehicle at a stop, referred to herein as a real-time method, is to use real-time observations of vehicles in the transportation system and assume that the vehicles performances will remain the same until the estimated time of arrival. For example, upon the observation that a vehicle is delayed arriving at a stop, it can be assumed that the observed delay will propagate at subsequent stops down the route. Therefore, a new estimated time of arrival can be computed by adding the observed delay to the scheduled time of arrivals at those stops. Another real-time approach is to measure the travel times of vehicles ahead of the vehicle for which estimated time of arrival is computed, and to assume that vehicles after that will experience the same travel time.

Yet another method of estimating a time of arrival of a vehicle at a stop, referred to herein as a predictive method, is to use predictive models that utilize real time observations of vehicle performances with a history of past vehicle performances of the same vehicle routes and calculate from this comparison what the most likely estimated time of arrival. Vehicle performances can be measured in terms of delay, or travel times on individual sections of the routes, or the like. In exemplary embodiments, in order to make more accurate predictions, the predictive models can include other exogenous source of data that may directly or indirectly impact the prediction, such as type of day (weekday, weekend, holidays, etc.), time of day (rush hour, quiet hour), weather, and the like. While the predictive method produces more accurate estimated times of arrival, it requires historical data in order to compute the prediction. Accordingly, it can only be applied to cases where the vehicle journey do not change frequently so that a substantial amount of historical data can be constituted before the system is put into service.

In exemplary embodiments, methods and systems are provided for accurately predicting an estimated time of arrival of a vehicle at a scheduled stop in a scheduled transportation system. The methods and systems utilize partial dynamic and historical contextual information to predict estimated time of arrivals in real time at scheduled stops, where schedules may change frequently. In exemplary embodiments, the methods and system may include a confidence level associated with the estimated time of arrival, which can be automatically improved as more contextual or historical information becomes available.

Figure 1:
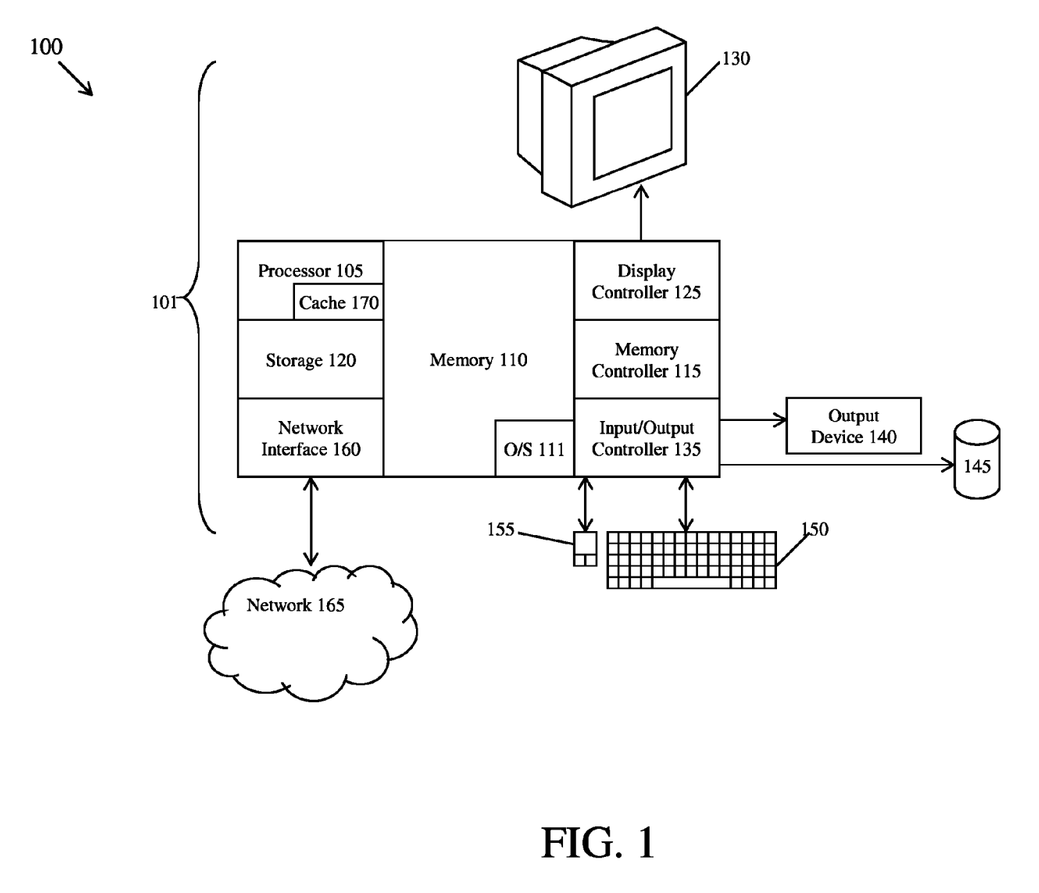
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

Figure 2:
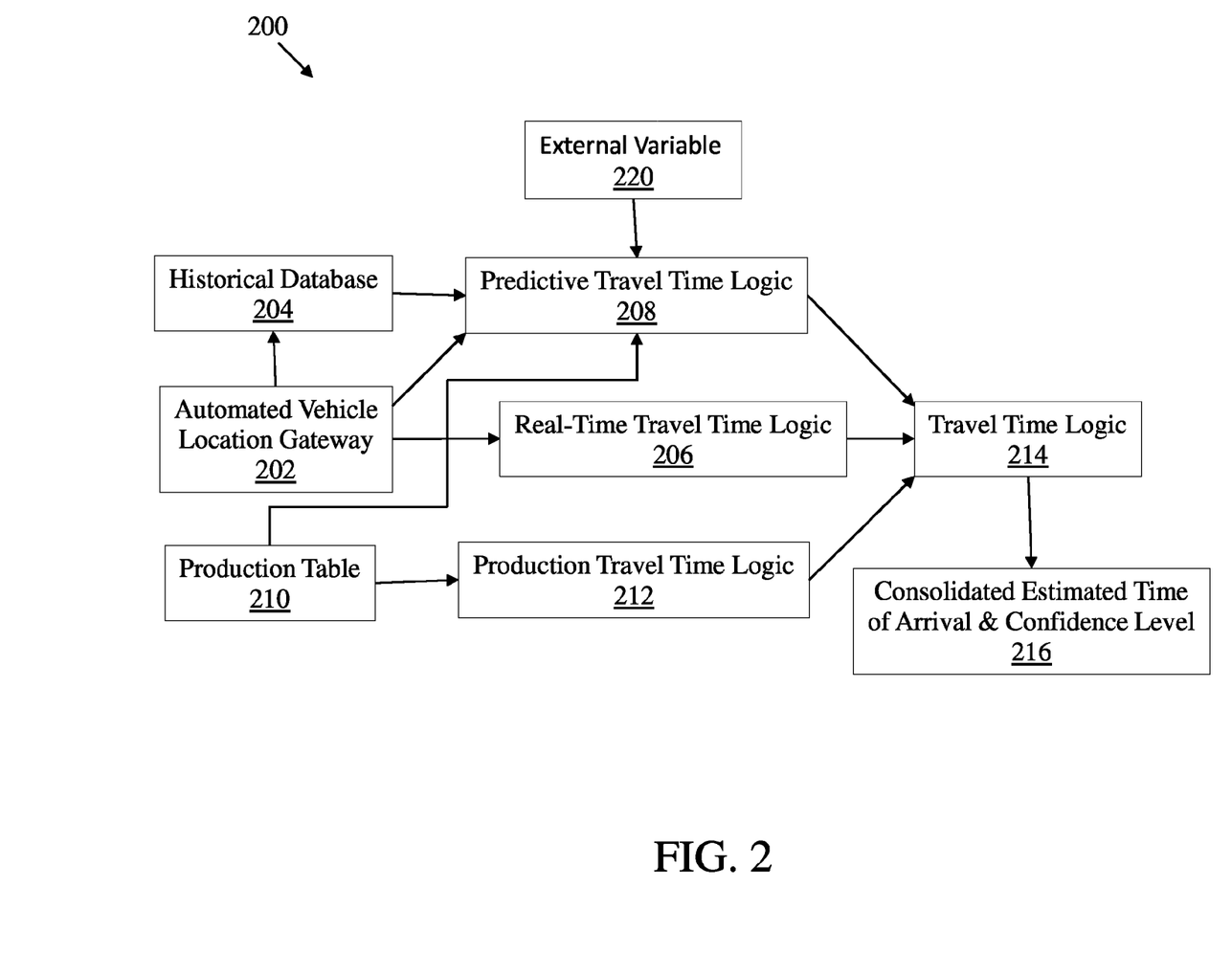
FIG. 2 illustrates a block diagram of a system for providing a consolidated estimated time of arrival in a scheduled transportation system in accordance with an embodiment.

Referring now to FIG. 2, a block diagram of a system 200 for estimating a time of arrival in a scheduled transportation system in accordance with an embodiment is shown. As illustrated the system 200 includes an automated vehicle location gateway 202, which is configured to monitor the location of the vehicles in the scheduled transportation system. The automated vehicle location gateway 202 is configured to provide information regarding the location of the vehicles to a historical database 204 and to real-time travel time logic 206. The real-time travel time logic 206 is configured to use the received location of the vehicles to calculate a real-time estimated time of arrival and to provide that estimation to the travel time logic 214. The system 200 also includes a production travel time logic 212 which is configured to receive a production table 210 and to calculate a scheduled time of arrival and to provide that estimation to the travel time logic 214. In exemplary embodiments, the production table 210 includes the scheduled locations and times for the vehicles stops in the scheduled transportation system and may be updated on a regular basis. The system 200 further includes predictive travel time logic 208 that is configured to receive vehicle information from the automated vehicle location gateway 202, historical information from the historical database 204, and the production table 210. The predictive travel time logic 208 is further configured to calculate a predictive estimated time of arrival and to provide that estimation to the travel time logic 214. In exemplary embodiments, the travel time logic 214 is configured to receive at least one of the scheduled time of arrival, the real-time estimated time of arrival, and the predictive estimated time of arrival and to calculate a consolidated estimated time of arrival 216. In exemplary embodiments, the consolidated estimated time of arrival 216 may include a confidence level associated with the consolidated estimated time of arrival 216

In one embodiment, the historical database 204, the real-time travel time logic 206, the predictive travel time logic 208, the production table 210, the production travel time logic 212, and the travel time logic 214 may be embodied in a computer similar to the one shown in described with reference to FIG. 1. In other embodiments, the historical database 204, the real-time travel time logic 206, the predictive travel time logic 208, the production table 210, the production travel time logic 212, and the travel time logic 214 may be embodied across multiple separate computers that may each be similar to the one shown in described with reference to FIG. 1.

In exemplary embodiments, the predictive travel time logic 208 may use other external variables 220 such as weather, time of day, type of day (holiday, weekday, week-end, schoolday), traffic conditions, etc. in place of or in combination with the historical data 204. Furthermore, predictive travel time logic 208 may be configured to put a higher weight on historical data 204 measured in conditions that are similar to the current conditions given by the external variables 220.

In exemplary embodiments, the travel time logic 214 is configured to compute a consolidated estimated time of arrival and corresponding confidence level indicative of the accuracy of the consolidated estimated time of arrival. The confidence level may be based on the amount of information that is available to the travel time logic 214. Even with limited information available, the travel time logic 214 is capable of computing a consolidated estimated time of arrival but with a low confidence level. For example, the travel time logic 214 is configured to calculate a consolidated estimated time of arrival based on any combination of one or more of the scheduled time of arrival, the real-time estimated time of arrival, and the predictive estimated time of arrival. As more information becomes available to the travel time logic 214, such as real-time observations and historical data from earlier observations, the travel time logic 214 can learn from the historical performances of the scheduled transportation system and compute a consolidated estimated time of arrival with an increased confidence level.

In exemplary embodiments, the travel time logic 214 combines one or more of the scheduled time of arrival, the real-time estimated time of arrival, and the predictive estimated time of arrival and computes a consolidated estimated time of arrival by assigning a weight to each of the received estimated time of arrival. The travel time logic 214 is also configured to calculate a confidence level for the consolidated estimated time of arrival which is at least as good as the best confidence level of each individual estimated time of arrival.

In one embodiment, when computing the consolidated estimated time of arrival for which there is no historical or real-time information available, the travel time logic 214 may assign a high weight to the scheduled time of arrival computed. As real-time observation becomes available the travel time logic 214 can gradually increase the weight assigned to the real-time estimated time of arrival and decrease the weight of the scheduled time of arrival. In addition, the travel time logic 214 can increase the confidence level if the real-time estimated time of arrival and scheduled time of arrival agree. In another embodiment, the travel time logic 214 may associate a higher weight with the predictive estimated time of arrival than with the scheduled time of arrival and real-time estimated time of arrival. In addition, the travel time logic 214 may further increase the confidence level of the consolidated estimated time of arrival computed using a predictive estimated time of arrival if it agrees with the real-time estimated time of arrival and/or the static real-time estimated time of arrival.

In exemplary embodiments, the travel time logic 214 can utilize the predictive estimated time of arrival before historical data on the vehicle journey becomes available by using a predictive estimated time of arrival computed using predictive travel time logic 208 with historical data from combinations of vehicle journey that are similar to the vehicle journey. In exemplary embodiments, the travel time logic 214 can compute a consolidated estimated time of arrival using a mix of the predictive, real-time and scheduled time of arrivals applied to different segments of the same vehicle journey. For example, the stops at the beginning of a journey, or in a specific portion of a journey may be more likely to be in line with the static prediction because the amount of time for uncertainty to accumulate is very small.

In exemplary embodiments, a vehicle journey can be segmented into sequences of stop pairs and the travel times and stop times can be calculated individually for each pair of stops using one or more of the predictive, real-time and static methods. In exemplary embodiment, the travel time logic 214 first uses the predictive estimated time of arrival to calculate the consolidated estimated time of arrival. If no predictive estimated time of arrival is available, the travel time logic 214 uses the real-time estimated time of arrival to calculate the consolidated estimated time of arrival. Finally the travel time logic 214 uses a scheduled time of arrival if neither a predictive or real-time estimated time of arrival is available.

Figure 3:
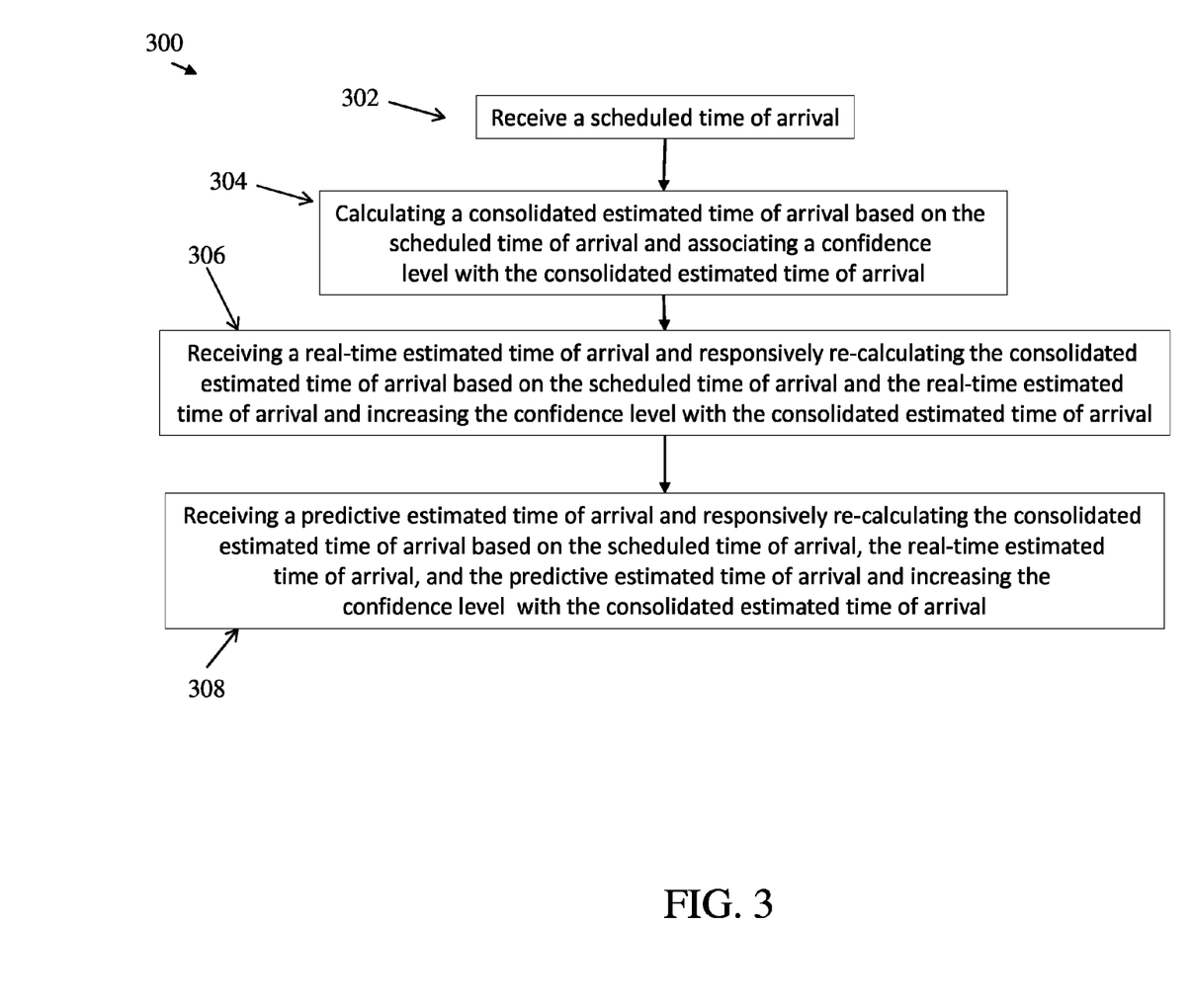
FIG. 3 illustrates a flow diagram of a method for providing a consolidated estimated time of arrival in a scheduled transportation system in accordance with an embodiment.

Referring now to FIG. 3, a flow chart illustrating a method 300 for providing a consolidated estimated time of arrival in a scheduled transportation system in accordance with an exemplary embodiment is shown. As shown at block 302, the method 300 includes receiving a scheduled time of arrival. Next, as shown at block 304, the method 300 includes calculating the consolidated estimated time of arrival based on the scheduled time of arrival and associating a confidence level with the consolidated estimated time of arrival. The method 300 also includes re-calculating the consolidated estimated time of arrival based on the scheduled time of arrival and the real-time estimated time of arrival and increasing the confidence level with the consolidated estimated time of arrival based on receiving a real-time estimated time of arrival, as shown at block 306. Next, as shown at block 308, based on receiving a predictive estimated time of arrival, the method 300 includes re-calculating the consolidated estimated time of arrival based on the scheduled time of arrival, the real-time estimated time of arrival, and the predictive estimated time of arrival and increasing the confidence level with the consolidated estimated time of arrival.

In exemplary embodiments, the scheduled transportation system may consist of a plurality of transport modalities. The method 300 can be used to support a dynamic inter-modal journey advisor that assists travelers in navigating the scheduled transportation system. The advisor may be configured to predict risks of missing a connection and automatically re-plan and suggest alternative routes when the risks exceed a threshold level.

Figure 4:
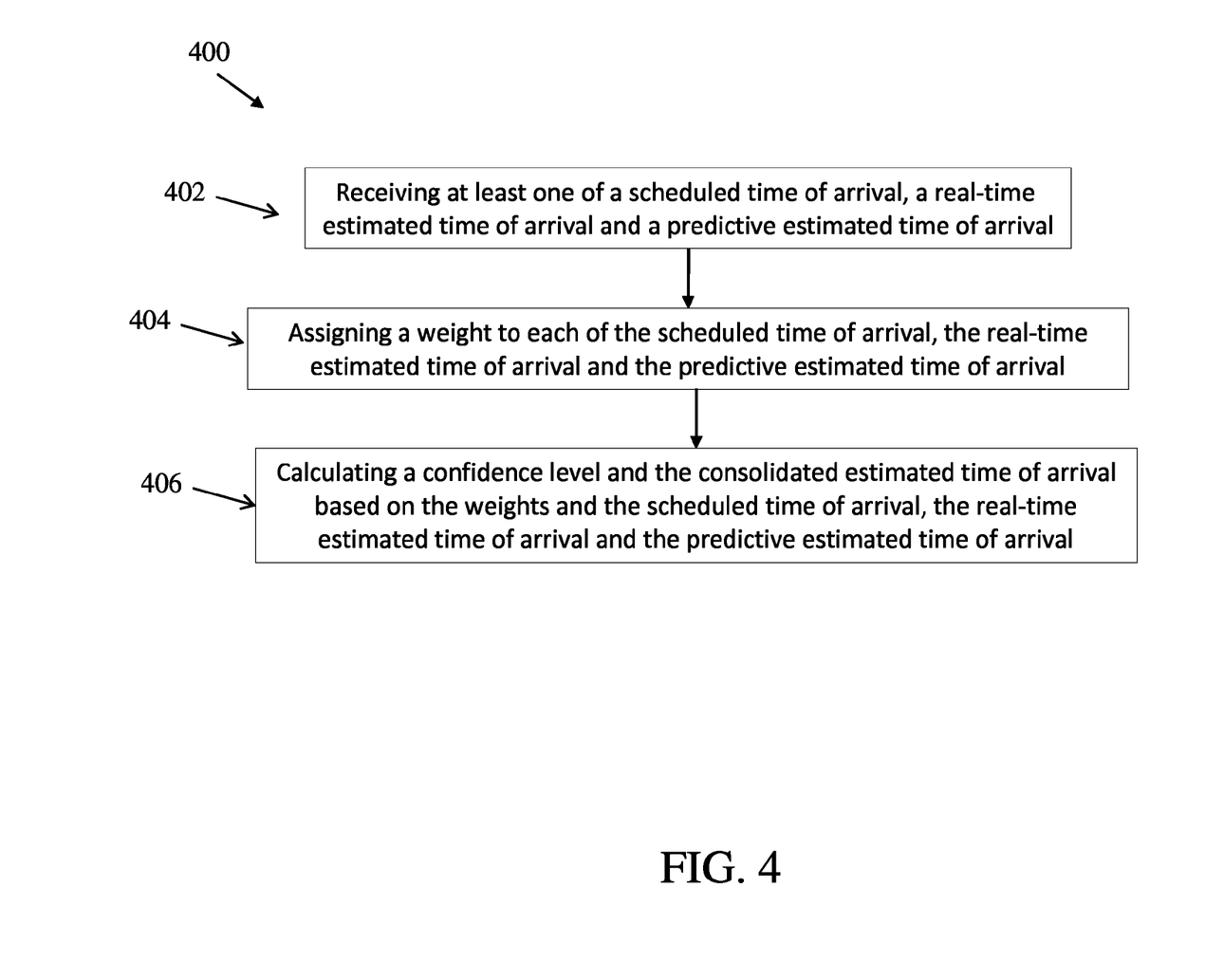
FIG. 4 illustrates a flow diagram of another method for providing a consolidated estimated time of arrival in a scheduled transportation system in accordance with an embodiment.

Referring now to FIG. 4, a flow chart illustrating a method 400 for providing a consolidated estimated time of arrival in a scheduled transportation system in accordance with an exemplary embodiment is shown. As shown at block 402, the method 400 includes receiving at least one of a scheduled time of arrival, a real-time estimated time of arrival and a predictive estimated time of arrival. Next, as shown at block 404, the method 400 includes assigning a weight to each of the scheduled time of arrival, the real-time estimated time of arrival and the predictive estimated time of arrival. As shown at block 406, the method 400 includes calculating a confidence level and the consolidated estimated time of arrival based on the weights and the scheduled time of arrival, the real-time estimated time of arrival and the predictive estimated time of arrival.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing a consolidated estimated time of arrival in a scheduled transportation system, the method comprising:
    receiving a production table that includes a scheduled location and a scheduled time of arrival at each of a plurality of stops along a route for each of a plurality of vehicles in the scheduled transportation system, which includes a plurality of routes;
    calculating, by a processor, the consolidated estimated time of arrival for each of the plurality of vehicles at each of the stops based on the scheduled time of arrival and associating a confidence level with the consolidated estimated time of arrival;
    calculating, by the processor, a risk of a passenger in the scheduled transportation system of missing a connection based on the consolidated estimated time of arrival and providing an alternative route to the passenger when the risk exceeds a threshold level;
    based on receiving a real-time estimated time of arrival for one or more of the plurality of vehicles for one of the stops, re-calculating, by the processor, the consolidated estimated time of arrival based on the scheduled time of arrival and the real-time estimated time of arrival and increasing the confidence level with the consolidated estimated time of arrival; and
    based on receiving a predictive estimated time of arrival for one or more of the plurality of vehicles for one of the stops, re-calculating, by the processor, the consolidated estimated time of arrival based on the scheduled time of arrival, the real-time estimated time of arrival, and the predictive estimated time of arrival and increasing the confidence level with the consolidated estimated time of arrival,
    wherein the scheduled transportation system comprises at least two transport modalities and wherein the predictive estimated time of arrival is calculated based at least one of a real time data, a historical data and one or more external variables including a current weather and traffic conditions and wherein the predictive estimated time of arrival is the historical data calculated by assigning a higher weight to historical data measured in weather and traffic conditions that are comparable to current conditions given by the one or more external variables.

2. The method of claim 1, wherein re-calculating the consolidated estimated time of arrival based on the scheduled time of arrival and the real-time estimated time of arrival comprises assigning a first weight to the real-time estimated arrival and a second weight to the scheduled time of arrival, wherein the weight assigned to the scheduled time of arrival is based on an amount of historical and real-time information available.

3. The method of claim 2, wherein the first weight and second are calculated based on at least one of a confidence level of the scheduled time of arrival and a confidence level of the real-time estimated time of arrival.

4. The method of claim 3, wherein the confidence level of the real-time estimated time of arrival is based on an availability of data and a quality of data.

5. The method of claim 1, wherein re-calculating the consolidated estimated time of arrival based on the scheduled time of arrival, the real-time estimated time of arrival, and the predictive estimated time of arrival comprises assigning a first weight to the predictive estimated arrival and a second weight to the real-time estimated time of arrival.

6. The method of claim 1, wherein the real-time estimated time of arrival is based upon vehicle information received from a piece of equipment in the scheduled transportation system.

7. A method for providing a consolidated estimated time of arrival in a scheduled transportation system, the method comprising:
    receiving a scheduled time of arrival, a real-time estimated time of arrival and a predictive estimated time of arrival, wherein the scheduled time of arrival is based upon a production schedule that includes a scheduled location and a scheduled time of arrival at stops along a route for each of a plurality of vehicles in the scheduled transportation system, which includes a plurality of routes;
    assigning a weight to each of the scheduled time of arrival, the real-time estimated time of arrival and the predictive estimated time of arrival, wherein the weight assigned to the scheduled time of arrival is based on an amount of historical information available and wherein the weight assigned to the real-time estimated time of arrival is based on an availability of real-time data and a quality of the real-time data;

calculating, by a processor, a confidence level and the consolidated estimated time of arrival based on the weights and the scheduled time of arrival, the real-time estimated time of arrival and the predictive estimated time of arrival; and calculating, by the processor, a risk of a passenger in the scheduled transportation system of missing a connection based on the consolidated estimated time of arrival and providing an alternative route to the passenger when the risk exceeds a threshold level;

wherein the scheduled transportation system comprises at least two transport modalities and wherein the predictive estimated time of arrival is calculated based upon a historical data and one or more external variables including a current weather and traffic conditions and wherein the predictive estimated time of arrival is the historical data calculated by assigning a higher weight to historical data measured in weather and traffic conditions that are comparable to current conditions given by the one or more external variables.

8. The method of claim 7, wherein the real-time estimated time of arrival is based upon vehicle information received from an automated vehicle location gateway.

* * * * *